US007154197B2

(12) United States Patent
Suita et al.

(10) Patent No.: US 7,154,197 B2
(45) Date of Patent: Dec. 26, 2006

(54) CONTROL APPARATUS AND CONTROL METHOD FOR THE SAME

(75) Inventors: Kazutsugu Suita, Toyota (JP); Kanji Matsushima, Kobe (JP); Yoshinori Kakuda, Toyama-ken (JP)

(73) Assignees: Toyota Jidosha Kabushiki Kaisha, Aichi-ken (JP); Kawasaki Jukogyo Kabushiki Kaisha, Hyogo-ken (JP); Nachi-Fujikoshi Corp., Toyama-ken (JP)

( * ) Notice: Subject to any disclaimer, the term of this patent is extended or adjusted under 35 U.S.C. 154(b) by 416 days.

(21) Appl. No.: 10/156,069

(22) Filed: May 29, 2002

(65) Prior Publication Data

US 2003/0018411 A1    Jan. 23, 2003

(30) Foreign Application Priority Data

May 30, 2001    (JP)    ............. P. 2001-163407

(51) Int. Cl.
*H02H 11/00* (2006.01)
(52) U.S. Cl. ............................................. 307/326
(58) Field of Classification Search ........ 307/112, 307/114, 326; 200/51 LM, 573; 318/568.13
See application file for complete search history.

(56) References Cited

U.S. PATENT DOCUMENTS 4,990,729 A * 2/1991 Toyoda et al. ......... 200/293.1
5,212,433 A * 5/1993 Yasuyuki ............... 318/568.13
5,444,342 A * 8/1995 Matsuo et al. ............ 318/563
5,665,945 A * 9/1997 Oshima ..................... 200/1 R
5,692,057 A * 11/1997 Grad et al. .................. 381/77
6,160,324 A * 12/2000 Terada et al. ............... 307/116
6,180,898 B1 * 1/2001 Terada et al. .......... 200/51 LM

FOREIGN PATENT DOCUMENTS

| JP | 6-134685 | 5/1994 |
| JP | 8-90485 | 4/1996 |
| JP | 10-291189 | 11/1998 |
| JP | 11-77579 | 3/1999 |

* cited by examiner

*Primary Examiner*—Robert L. Deberadinis
(74) *Attorney, Agent, or Firm*—Finnegan, Henderson, Farabow, Garrett & Dunner, LLP

(57) ABSTRACT

A control apparatus is provided which is selectively placed in an allowed state in which the apparatus is allowed to be operated and an inhibited state in which the apparatus is inhibited from being operated. The control apparatus includes a first three-position switch and a second three-position switch, each of which has a non-pressed position, an optimum operated position, and an over-pressed position. A controller of the apparatus establishes the inhibited state, irrespective of the operated positions of the three-position switches, when it is determined that both of the first and second three-position switches are pressed down, and establishes the allowed state when it is determined that only one of the first and second three-position switches is pressed down, and is operated to the optimum operated position.

17 Claims, 3 Drawing Sheets

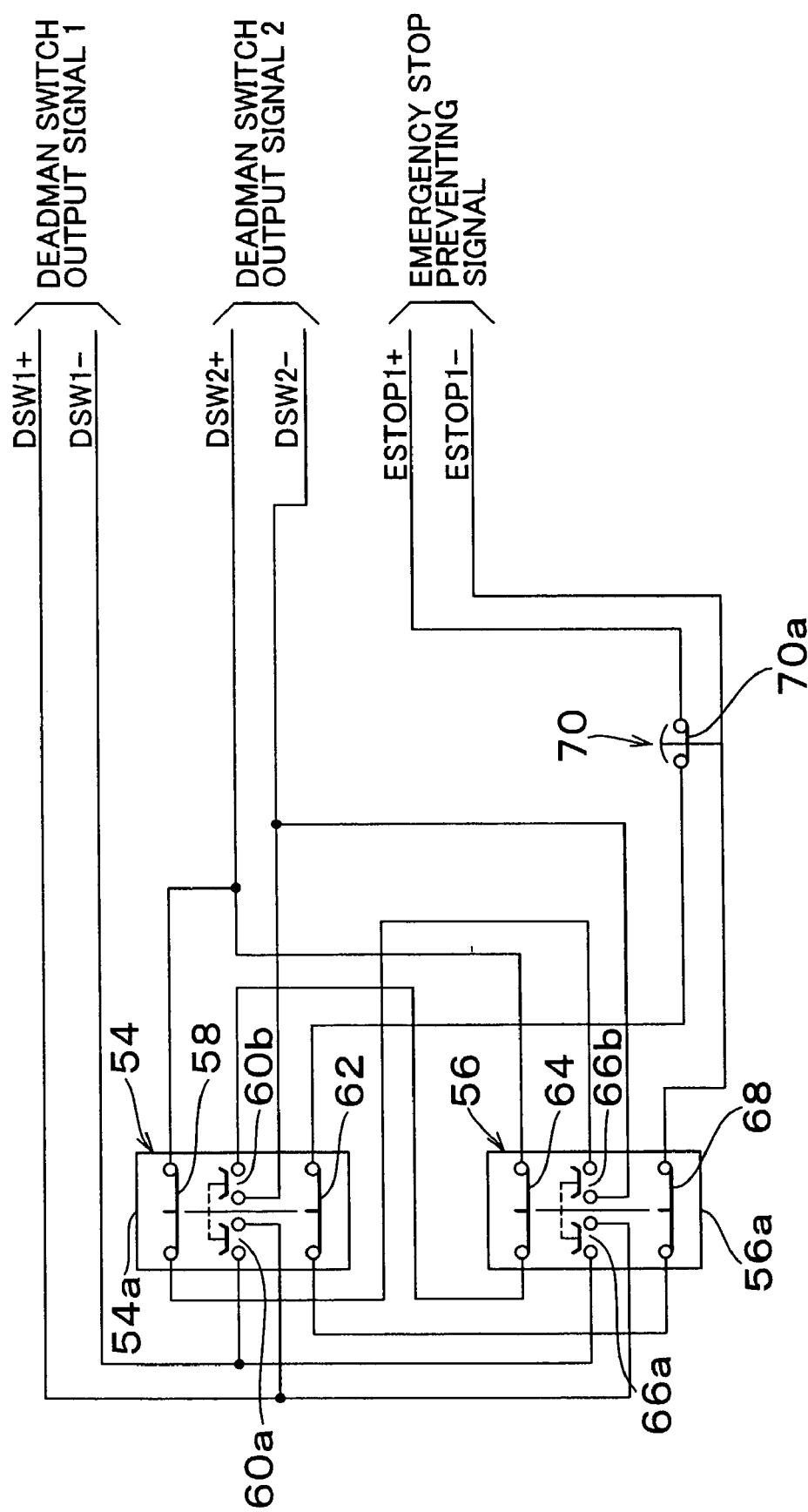

CONTROL APPARATUS AND CONTROL METHOD FOR THE SAME

INCORPORATION BY REFERENCE

The disclosure of Japanese Patent Application No. 2001-163407 filed on May 30, 2001, including the specification, drawings and abstract, is incorporated herein by reference in its entirety.

BACKGROUND OF THE INVENTION

1. Field of the Invention

The invention relates to a control apparatus adapted for performing teaching or simulation of operations or actions with respect to an industrial robot, a machine tool, or the like, and also relates to a control method of controlling the apparatus.

2. Description of Related Art

Conventionally, in production lines of plants, many industrial robots are used for automatically performing welding, parts assembling, transportation, and other operations. These industrial robots are taught or programmed in advance by dedicated control apparatus to perform predetermined operations or to make a series of movements or actions. Then, the industrial robots carry out various works in the production lines by repeating the content of teaching or programming. The control apparatus is generally called a "teaching apparatus", and one example of the apparatus, which is of a portable type, is called "teach pendant". Such teach pendants are also used for teaching or programming processing procedures to various types of machining tools, such as NC machining tools.

Normally, an operator holds such a teach pendant with one hand, and performs teaching operations by operating or manipulating input keys, or the like, with the other hand. In this case, industrial robots, NC machining tools, or the like (hereinafter generally called "machine") to be taught or programmed to perform operations or make movements or actions step by step in accordance with the teaching operations. These operations include driving of a motor, turning of an arm(s), energization of a working head (such as a welding gun), and the like. In some cases, the apparatus performs an operation or a movement different from that intended by the teaching operator, due to a teaching error, a mechanical failure of the machine, or the like. In order to avoid danger to workers, including the operator, in the vicinity of the machine and to prevent damage to the machine, the control apparatus needs to be constructed such that teaching operations of the apparatus are inhibited or the machine is immediately stopped if any of the above dangerous situations occur.

In view of the above-described situations, a conventional teach pendant is provided with a switch called a "deadman switch". The deadman switch is designed to establish an operation permission state in which the teach pendant is allowed to perform teaching operations and the machine is allowed to make movements only when the teaching operator holds or grips the teach pendant in his or her normal posture. For example, a two-position type deadman switch is arranged to permit the teach pendant to be operated only when the teaching operator is pressing down on the deadman switch, and to inhibit operations of the teach pendant, and eventually inhibit operations of the machine, when the teaching operator releases the deadman switch. This type of deadman switch is disposed at a position where the fingers supporting the teach pendant contact the switch. For example, a deadman switch is disposed at a position where right-hand fingers or left-hand fingers contact the reverse side of a housing of the teach pendant. Experimentally, the teaching operator tends to release the teach pendant at the moment that he/she is surprised by, or feels danger, caused by an abnormality in the operation (e.g., movements) of the machine for some reason. In view of this tendency, the teach pendant is inhibited from being operated or the machine is stopped when the deadman switch is turned off, thus assuring improved safety.

In other cases, people tend to grip a nearby object hard when they are surprised. If the operator grips the teach pendant 10 hard when he/she is surprised at an abnormality in the operation of the machine, the two-position type deadman switch is held in the ON state, and cannot inhibit the operation of the teach pendant 10. To deal with this situation, a three-position type deadman switch has been proposed. The deadman switch of this type permits the operation of the teach pendant 10 only when a switch portion is pressed down with a predetermined pressure, and inhibits the operation of the teach pendant 10 when the deadman switch is released or gripped hard. Thus, the three-position type deadman switch ensures higher safety and is more highly recommended in view of the typical behavior of human beings. Use of the three-position deadman switch is mandatory in certain locales and circumstances.

However, the teaching operator may perform a teaching (input) operation with the right hand while holding the teach pendant with the left hand, or may perform a teaching (input) operation with the left hand while holding the teach pendant with the right hand. In addition, the operator may hold the teach pendant first with one hand and then with the other hand, namely, the operator may switch bands for holding the teach pendant, since his/her fingers or arms may get tired during a long-term teaching operation. In view of these situations, the teach pendant may be provided with two deadman switches, namely, one at a position where the left-hand fingers touch the pendant, and the other at a position where the right-hand fingers touch the pendant. In these cases, the two dead switches are arranged to function independently to allow the teach pendant to perform operations.

As described above, when the teaching operator is surprised, he/she does not necessarily release the teach pendant, but may grip hard the teach pendant as one of nearby objects. At this time, if the teach pendant has two deadman switches, one for the left hand and one for the right hand, as described above, one of the deadman switches may be gripped hard, and the other deadman switch may be gripped softly (in a normal operating state with a predetermined pressure). In this case, since the deadman switch that is gripped softly is made effective, the teach pendant and the machine to be programmed are kept operating or moving. Thus, in spite of the provision of the deadman switches, the teaching pendant is not smoothly shifted to an operation inhibited state when it falls into an abnormal state different from the normal state. Meanwhile, when two three-position type deadman switches are disposed, it may be possible to provide a mechanical or electrical changeover switch that enables the teaching operator to select which deadman switch should be made effective. It is, however, necessary to perform a switching operation with the changeover switch each time the hand holding the teach pendant is replaced by the other hand during normal work, resulting in poor handling and reduced efficiency.

SUMMARY OF THE INVENTION

It is an object of the invention to provide a control apparatus and a method for performing teaching or simulation of operations or actions with respect to an industrial robot, a machine tool, or the like, assuring improved ease of handling and increased safety in view of the user's behavior.

To accomplish the above and/or other object(s), there is provided according to a first aspect of the invention a control apparatus that is selectively placed in an allowed state in which the apparatus is allowed to be operated and an inhibited state in which the apparatus is inhibited from being operated. The control apparatus includes: (a) a first switch and a second switch, each of which has a plurality of operated positions including a non-pressed position at which a press stroke over which the switch is pressed is smaller than a predetermined range, an optimum operated position at which the press stroke is within the predetermined range, and an over-pressed position at which the press stroke is larger than the predetermined range, (b) a detector that individually determines whether the first switch is pressed down, and whether the second switch is pressed down, and (c) a controller that establishes the inhibited state of the control apparatus, irrespective of the operated positions of the switches, when the detector determines that both of the first switch and the second switch are pressed down, and establishes the allowed state of the apparatus when the detector determines that only one of the first switch and the second switch is pressed down, and is operated to the optimum operated position.

With the control apparatus constructed as described above, the inhibited state of the apparatus is established, regardless of the operated positions of the switches, when it is detected that both of the first switch and the second switch are pressed down. Thus, even if the operator grips the two switches in an emergency case, for example, the operation of the apparatus can be immediately stopped. In the meantime, when it is detected that only one of the first switch and the second switch is pressed down, the position of the currently pressed switch is made effective. If the currently pressed switch is operated to the optimum operated position, the allowed state of the apparatus is established. Thus, the control apparatus is allowed to perform operations immediately after switching of the hand for holding the control apparatus, thus permitting smooth and highly efficient operation. In one preferred embodiment of the invention, each of the first and second switches is in the form of a three-position switch.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 3 is an explanatory view showing a circuit arrangement for identifying or discriminating operating states of the control apparatus (i.e. the teach pendant) according to a second embodiment of the invention.

DETAILED DESCRIPTION OF PREFERRED EMBODIMENTS

Figure 1A:
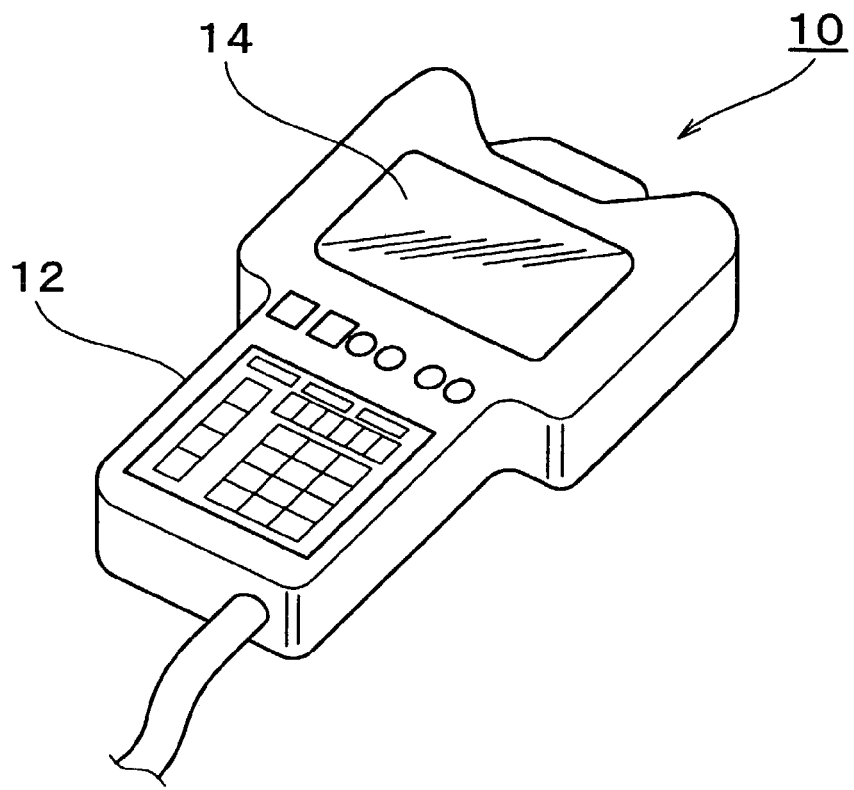
FIG. 1A is a perspective view showing an exterior of a control apparatus (i.e. a teach pendant) according to an exemplary embodiment of the invention.
Figure 1B:
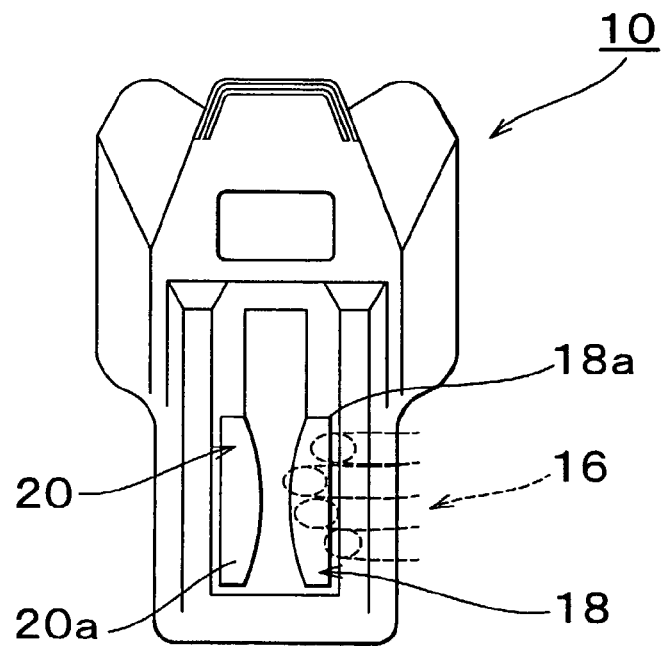
FIG. 1B is a rear view of the exterior of the control apparatus depicted in FIG. 1A.

FIG. 1A and FIG. 1B schematically show the exteriors of a control apparatus (hereinafter referred to as a teach pendant) 10 according to an exemplary embodiment of the invention. FIG. 1A shows the front side (i.e. operational side) of the teach pendant 10, and FIG. 1B shows the reverse side thereof. As shown in FIG. 1A, the teach pendant 10 is provided at the front side thereof with an input portion 12 and a display portion (such as a liquid crystal display) 14. The input portion 12 receives input information, such as commands and/or numerical values, for teaching a machine to be operated, for example, an industrial robot, such as an automatic welding robot or an automatic assembly robot or the like, so that the machine is programmed to perform a specified operation(s). The display portion 14 displays input results, various messages, and the like.

When a teaching operator operates or manipulates the teach pendant 10 to perform, for example, a teaching operation, the operator supports or holds the teach pendant 10 with one hand, and operates the aforementioned input portion 12 with the other hand. For example, when the teach pendant 10 is held by the left hand, left-hand fingers 16 (except the thumb) are brought into touch with the reverse side of the teach pendant 10, shown in FIG. 1B. In this embodiment, deadman switches (three-position type switches) 18, 20 are disposed on the reverse side of the teach pendant 10. The deadman switches 18, 20 are adapted to establish one of two states, i.e., an allowed state in which the teach pendant 10 is allowed to be operated, in other words, operations or movements of the machine, such as an industrial robot, are permitted, and an inhibited state in which the teach pendant 10 is inhibited from being operated, in other words, operations or movements of the machine are inhibited. As shown in FIG. 1B, a knob 18a of the deadman switch 18 (the first three-position type switch) is disposed at a position that allows tips of the left hand fingers 16 to contact the knob 18a when the teach pendant 10 is normally held with the left hand of the operator. Similarly, a knob 20a of the deadman switch 20 (the second three-position type switch) is disposed at a position that allows fingertips of the right hand to contact the knob 20a when the teach pendant to is normally held with the right hand of the operator.

The deadman switches 18, 20, which are press-return type switches, have three operating positions, i.e., a non-pressed position, an optimum position, and an over-pressed position. Each of the deadman switches 18, 20 is arranged to continuously switch or change from one of these operating positions to its adjacent operating position. More specifically, the deadman switch 18 (20) is in the optimum position when the knob 18a (20a) of the switch 18a (20a) is located in a predetermined range around the middle of the full press stroke thereof. Also, the deadman switch 18 (20) is in the non-pressed position (including a state in which no finger, or the like, contact the knob 18a (20a) at all) when the knob 18a (20a) is located in a range in which the press stroke is smaller than that in the above predetermined range. Further, the deadman switch 18 (20) is in the overpressed position when the knob 18a (20a) is located in a range in which the press stroke is greater than that in the above predetermined range. With this arrangement, the teach pendant 10 is allowed to be operated only when the knob 18a (20a) of the deadman switch 18 (20) is pressed down to the optimum position with the fingertips holding the teach pendant 10.

The present embodiment is characterized in that the teach pendant 10 is inhibited from being operated, which eventually inhibits operation of the machine to be programmed, regardless of the operating positions of the deadman switches 18, 20, when the knobs 18a, 20a of the deadman switches 18, 20 mounted in the teach pendant 10 are simultaneously operated, for example, when both of the deadman switches 18, 20 are pressed down.

Figure 2:
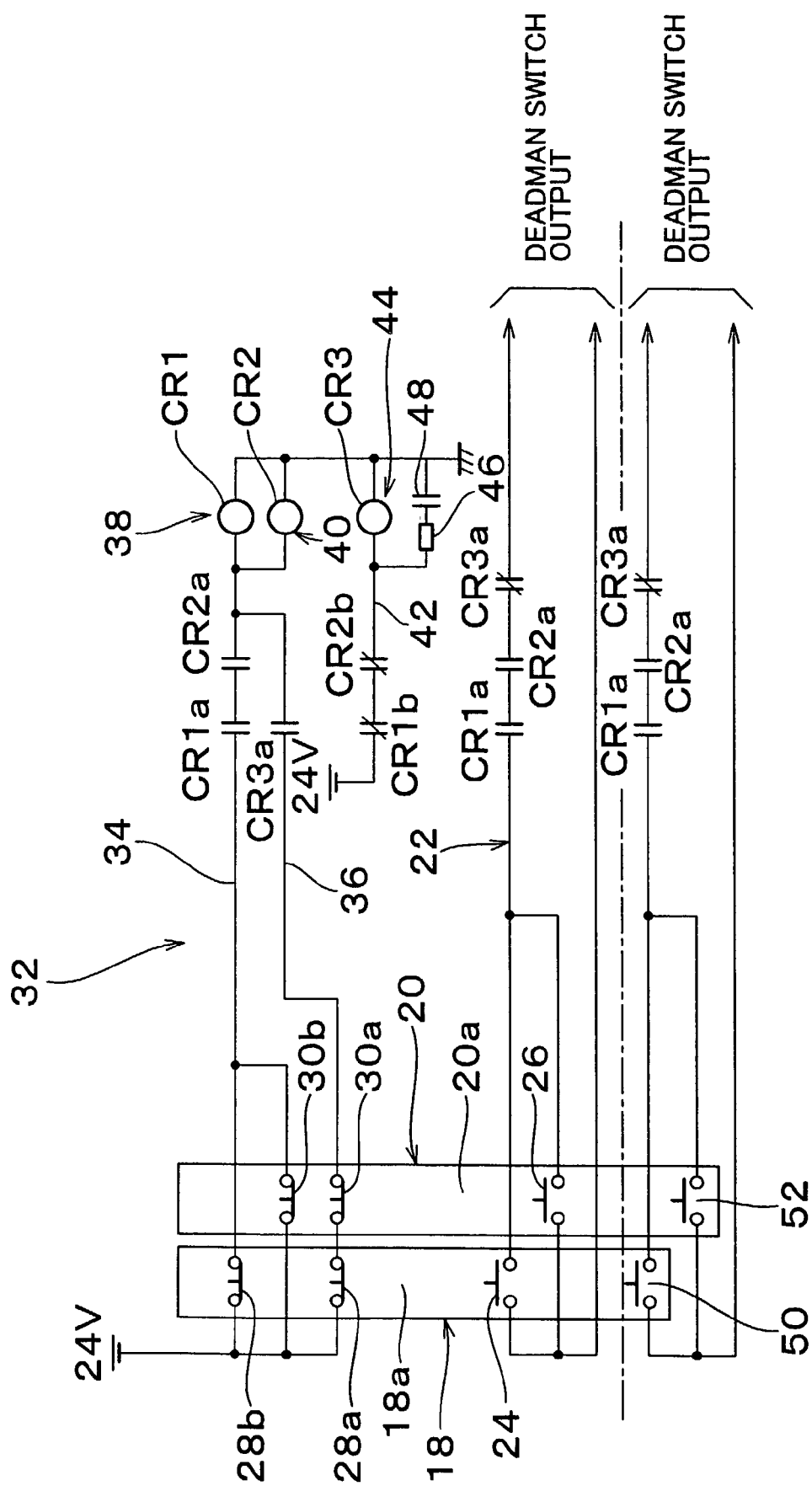
FIG. 2 is an explanatory view showing a circuit arrangement for identifying or discriminating operating states of the control apparatus (i.e. the teach pendant) according to the first embodiment of the invention.

FIG. 2 is a view explaining a circuit arrangement of the control apparatus (the teach pendant 10) of the above-described embodiment for enabling the above characteristic operations. The deadman switch 18 has an enable contact 24 that is placed in an open (OFF) position to cut off a circuit line 22 that activates the deadman switch 18 when the switch 18 is in the non-pressed position or the over-pressed position, or is placed in a closed (ON) position to connect the circuit line 22 when the switch 18 is in the optimum position. Similarly, the deadman switch 20 has an enable contact 26 that is placed in an open (OFF) position to cut off the circuit line 22 that activates the deadman switch 20 when it is in the non-pressed position or over-pressed position, or is placed in a closed (ON) position to connect the circuit line 22 when it is in the optimum position. The enable contacts 24, 26 are connected in parallel with the circuit line 22.

Further, the deadman switch 18 is provided with a first contact (b-contact: normally closed contact) 28a and a second contact (b-contact) 28b for detecting whether the deadman switch 18 is being operated. Similarly, the deadman switch 20 is provided with a third contact (b-contact) 30a and a fourth contact (b-contact) 30b for detecting whether the deadman switch 20 is being operated. These first to fourth contacts 28a, 28b, 30a, 30b are called "release detection contacts", and at least one of these contacts 28a, 28b, 30a, 30b is forced to open without fail when the knob(s) 18a, 20a of the deadman switch(es) 18, 20 is/are operated, so as to cut off at least one of lines 34, 36 that are connected in parallel and constitute a release detection circuit 32.

A coil CR1 of a relay 38 and a coil CR2 of a relay 40 are disposed in parallel in the release detection circuit 32. Further, a coil CR3 of a relay 44 is disposed in a line 42 included in the release detection circuit 32. The line 42 is independently connected to a power source (such as 24V). In addition, a resistance 46 and a capacitor 48 are connected in parallel with the coil CR3 of the relay 44, in order to delay turn-OFF of the coil CR3 for a predetermined period.

In the release detection circuit 32, as shown in FIG. 2, the first and third contacts 28a, 30a serving as release contacts and an a-contact (i.e., normally open contact) CR3a of the relay 44 are arranged in series on the line 36, to which the coils CR1, CR2 arranged in parallel is connected. On the line 34, the second and fourth contracts 28b, 30b serving as release contacts are disposed in parallel, and an a-contact CR1a of the relay 38 and an a-contact CR2a of the relay 40 are disposed in series in the later stage of the line 34. To the line 34 is further connected the coils CR1, CR2 that are arranged in series.

Furthermore, a b-contact CR1b of the relay 38 and a b-contact CR2B of the relay 40 are disposed in series on the line 42 to which the relay 44 is connected. In the meantime, an a-contact CR1a of the relay 38, an a-contact CR2a of the relay 40, and a b-contact CR3b of the relay 44 are arranged in series on the circuit line 22 including the enable contacts 24, 26 that are connected in parallel.

The operation of the circuit configured as described above will be explained referring to FIG. 1A, FIG. 1B, and FIG. 2.

First, when the teach pendant 10 is turned on while the knobs 18a, 20a of the deadman switches 18, 20 are not being operated, the b-contacts CR1b, CR2b on the line 42 are turned ON, and thus the coil CR3 is turned ON. As a result, the a-contact CR3a on the line 36 is turned ON. At this time, since the deadman switches 18, 20 are not operated, the first contact 28a and the third contact 30a are closed. Thus, the entire line 36 is closed, and power (such as 24V) is supplied to the coils CR1, CR2 to turn them ON. As a result, the a-contacts CR1a, CR2a are turned ON on the line 34 to which the second contact 28b and the fourth contact 30b that are currently ON are connected, so that a self-hold circuit for the coils CR1, CR2 is formed. With the coils CR1, CR2 thus turned ON, the line 42 including the b-contacts CR1b, CR2b is cut off. At this time, electric power discharged from the aforementioned capacitor 48 is supplied to the coil CR3 for a predetermined period of time, so that turning OFF of the coil CR3 can be delayed for a predetermined period even after the coils CR1, CR2 are turned ON. In this manner, the self-hold circuit for CR1, CR2 can be formed without fail. After a lapse of the predetermined period (namely, after discharging of the capacitor 48 is finished), the a-contact CR3a on the line 36 is turned OFF and the line 36 is cut off. However, the coils CR1, CR2 are kept in the ON state since self holding has been established by the a-contacts CR1a, CR2a on the line 34.

In this state, the a-contacts CR1a, CR2a and the b-contact CR3b on the circuit line 22 to which the enable contacts 24, 26 are connected are turned ON, and therefore the enable contacts 24, 26 are made operable or effective. Thus, a stand-by state is established which makes it possible to operate the teach pendant 10.

Next, the operation of the circuit of FIG. 2 in the case where the knob 18a (20a) of the deadman switch 18 (20) is operated will be explained.

When the teaching operator holds the teach pendant 10 with one hand (for example, with the left hand) as a normal operation, the operator presses down the knob 18a of the deadman switch 18. As a result, the first contact 28a and the second contact 28b are turned OFF (i.e., opened). However, since the knob 20a of the deadman switch 20 is not being operated, the fourth contact 30b is kept in the closed position so that the line 34 is kept closed. Thus, the coils CR1, CR2 are maintained in the ON state, and the circuit line 22 is kept closed. If the teaching operator operates the knob 18a to the optimum position in the predetermined range around the middle of the full press stroke, the enable contact 24 is closed so as to close the circuit line 22, and a deadman switch output signal that indicates that the deadman switch 18 is normally operated is generated to permit operations of the teach pendant 10. Namely, the teach pendant 10 is allowed to perform teaching operations and movement monitoring operations on the machine to be programmed by the pendant 10. Thus, the machine, such as an industrial robot, is allowed to be operated by the teach pendant 10.

Similarly, when only the knob 20a of the deadman switch 20 is pressed down with the right hand, the third contact 30a and the fourth contact 30b are turned OFF (i.e., opened), but the second contact 28b is kept in the closed position whereby the line 34 is kept closed. Thus, the coils CR1, CR2 are maintained in the ON state, and the circuit line 22 is kept closed. If the teaching operator operates the knob 20a to the optimum position in the predetermined range around the middle of the full press stroke, the teach pendant 10 is allowed to perform its operations, and the machine to be programmed by the pendant 10 is also allowed to perform its operations.

During an operation of the teach pendant 10, the teaching operator may operate both of the deadman switches 18, 20 for some reason. For example, when the machine performs an operation (or makes a movement) that is not intended by the teaching operator, the operator may be so surprised that he/she grips both of the deadman switches 18, 20. In such cases, both of the knobs 18a, 20a of the switches 18, 20 are pressed down and all the first to the fourth contacts 28a, 28b, 30a, 30b are turned OFF (i.e., opened), whereby both of the lines 34, 36 are cut off and self holding of the coils CR1, CR2 is cancelled. As a result, the a-contacts CR1a, CR2a on the circuit line 22 are turned OFF (i.e., opened), and the circuit line 22 is cut off. At this time, even if one or both of the knob 18a and the knob 20a is/are operated to the optimum position and the enable contacts 24, 26 are turned ON, the deadman switch output signal is shut off. Namely, the teach pendant 10 is inhibited from being operated by the teaching operator. In other words, the teach pendant 10 is inhibited from performing teaching operations or movement monitoring operations on the machine to be programmed by the pendant 10. Consequently, operation of the machine is inhibited.

When the teaching operator releases the teach pendant 10 from both hands, or when the knob 18a or 20a is gripped hard and the deadman switch 18 or 20 is operated to the over-pressed position, the deadman switch 18 (20) performs its intended function so that the circuit line 22 is cut off. Thus, no deadman switch output signal is generated, and the teach pendant 10, and the machine to be programmed, are inhibited from performing their operations.

After the teach pendant 10 has been placed in the inhibited state as described above, the operator is able to return the teach pendant 10 to the normal state, namely, the standby state established upon turn-on of the power source, by releasing both of the knobs 18a, 20a of the deadman switches 18, 20. When the operator releases the knobs 18a, 20a of the deadman switches 18, 20, the deadman switches 18, 20 switch from the over-pressed position to the non-pressed position through the optimum position. Upon passing the optimum position, the inhibited state of the teach pendant 10 that has been established is cancelled. Thus, it is preferable that the inhibited state is maintained until both of the knobs 18a, 20a of the deadman switches 18, 20 are completely operated to the non-pressed position, and that the teach pendant 10 returns from the inhibited state to the normal state after it is confirmed that both of the knobs 18a, 20a are placed in the non-pressed position. This arrangement may be realized by, for example, a relay circuit. The teach pendant 10 may return to the standby state according to other procedures or methods. It will be understood from the above description that the procedure for returning from the inhibited state to the normal (standby) state requires an intentional operation by the teaching operation, whereby the entire safety will be further improved.

In the present embodiment, two pieces of three-position type deadman switches 18, 20 are disposed which exhibit high reliability, with which the teach pendant 10 is inhibited from performing operations in extraordinary occasions, such as when the operator grips the pendant 10 hard or tightly. The use of the two deadman switches 18, 20 allows the operator to hold the teach pendant 10 with one hand and then with the other hand during teaching or programming operations, thus assuring improved handling ease. In the case where the teaching operator performs an operation different from normal operations, such as holding the teach pendant 10 with both hands, or bringing the deadman switch(es) 18, 20 to the over-pressed position, the teach pendant 10 is reliably inhibited from being operated, and the machine to be taught or programmed is immediately stopped (or its power source may be turned OFF as needed.) It is thus possible to provide a teaching apparatus (i.e. a control apparatus) that operates with improved safety in accordance with the behavior or movements of the teaching operator.

In the embodiment of FIG. 2, the enable contacts of the deadman switches 18, 20 are doubled. Namely, enable contacts 50, 52 are provided in addition to the enable contacts 24, 26, and the a-contacts CR1a, CR2a and b-contact CR3b are connected to the enable contacts 50, 52 in a similar manner. When the enable contact 24, 26 is closed, therefore, the enable contact 50, 52 is also closed, and the deadman switch output signals are generated at the same time. A control unit that receives the deadman switch output signals is able to immediately detect defects in welding or movement of the contacts by sensing disagreement between the signals generated from the two separate systems. Thus, the double arrangement of the enable contacts achieves improved safety. Needless to say, the safety may be ensured by using different methods, and may be improved by providing triple or multiple arrangements of enable contacts, or the like. It is, however, to be noted that the basic operation of the present embodiment can be accomplished without using the enable contacts 50, 52, and similar effects can be provided.

In the present embodiment, the relays, such as the coils 38, 40, 44, and the contacts are provided inside the teach pendant 10. Accordingly, input and output lines of the teach pendant 10 are almost the same as those of a conventional teach pendant in which deadman switches having only enable contacts are mounted. It is therefore possible to replace the conventional teach pendant with the teach pendant 10 of this embodiment without requiring changes in the machine to which the teach pendant is connected. It is also possible to use the teach pendant 10 for a conventional machine or apparatus. Needless to say, the relays, such as the coils 38, 40, 44, and the contacts may be arranged or provided separately from the teach pendant 10. In this case, too, substantially the same effects as those provided by this embodiment can be obtained.

FIG. 3 shows a circuit arrangement of a control apparatus (teach pendant 10) according to another embodiment of the invention, for carrying out functions similar to those of the above-described embodiment.

In this embodiment, two deadman switches are provided on the reverse side of the teach pendant 10 in a similar manner to that shown in FIG. 1. As shown in FIG. 3, each of the deadman switches 54, 56 of this embodiment is provided with means for discriminating a non-pressed position where a press stroke is smaller than a predetermined range, an optimum position where the press stroke is within the predetermined range, and an over-pressed position where the press stroke is larger than the predetermined range, from one another. More specifically, the deadman switch 54, 56 is provided with contacts that are individually opened or closed when the deadman switch is operated to the respective positions as indicated above. In the present embodiment, the deadman switch 54 (for example, one for the left hand), as a first three-position type switch, includes a first b-contact (normally closed contact: release contact) 58 for detecting the non-pressed position (including the case where a knob 54a of the deadman switch 54 is not being operated), first a-contacts (normally open contacts: enable contacts) 60a, 60b (i.e. two interlocked contacts in the embodiment) for detecting the optimum position, and a first over-press detection contact (normally closed contact) 62 for detecting the over-pressed position. In a similar manner, the deadman switch 56 (for example, one for the right hand), as a second three-position type switch, includes a second b-contact (normally closed contact) 64 for detecting the non-operated position, second a-contacts (normally open contacts) 66a, 66b for detecting the optimum position, and a second over-press detection contact (normally closed contact) 68 for detecting the over-pressed position.

The deadman switches 54, 56 with the aforementioned contact arrangement is designed such that the first a-contact 60a and the second a-contact 66a are connected in parallel, and a deadman switch output signal 1 is generated when either of the first and second a-contacts is turned ON (i.e., closed). Also, the first b-contact 58 of the deadman switch 54 and the second a-contact 66b of the deadman switch 56 are connected in series. A deadman switch output signal 2 is generated only when the deadman switch 54 is maintained in the non-pressed position, and the deadman switch 56 is operated to the optimum position. Similarly, the second b-contact 64 of the deadman switch 56 and the first a-contact 60b of the deadman switch 54 are connected in series, and the deadman switch output signal 2 is generated only when the deadman switch 54 is operated to the optimum position and the deadman switch 56 is maintained at the non-pressed position.

In the second embodiment, the operating state of the deadman switches 54, 56 is determined based on the agreement or coincidence of the presence or absence of the deadman switch output signals 1, 2.

Also in the circuit arrangement of FIG. 3, the first over-press detection contact 62 and the second over-press detection contact 68 are connected in series, and a signal for preventing an emergency stop is output via a normally closed contact 70a of an emergency stop switch 70 provided on the teach pendant 10. Therefore, when the deadman switch 54 or the deadman switch 56 is operated to the over-pressed position, or when the emergency stop switch is pressed down, the emergency stop preventing signal is shut off, and an emergency stop state is established.

The operation of the second embodiment with the circuit arrangement as mentioned above will be explained.

First, when the power supply of the teach pendant 10 is turned on but the deadman switches 54, 56 are not pressed down, the first a-contacts 60a, 60b and the second a-contacts 66a, 66b are in the OFF state (i.e., are kept in the open state). Thus, the deadman switch output signals 1, 2 are not generated. Therefore, the teach pendant 10 is inhibited from being operated, namely, the inhibited state of the teach pendant 10 is established.

Next, when only the deadman switch 54 is operated, namely, when the teach pendant 10 is held with one hand and used in a normal condition, the first a-contact 60a is turned ON (i.e., closed) so that a deadman switch output signal 1 is generated. At the same time, the line connecting the second b-contact 64 of the deadman switch 56 and the first a-contact 60b of the deadman switch 54 arranged in series is closed so that a deadman switch output signal 2 is generated. Thus, by confirming the ON-states of the deadman switch output signals 1, 2 (namely, by confirming that both of the output signals 1, 2 are generated), it is determined that only the deadman switch 54 is operated to the optimum position, and the teach pendant 10 is allowed to be operated, namely, operations and actions of the machine to be programmed are permitted. Similarly, when only the deadman switch 56 is operated to the optimum position, the allowed state of the teach pendant 10 is established.

When both of the deadman switches 54, 56 are operated to the optimum position, on the other hand, both of the first b-contact 58 and the second b-contact 64 are turned OFF (i.e., kept closed). As a result, the deadman switch output signal 2 is not generated while the deadman switch output signal 1 is generated with the first a-contact 60a and the second a-contact 66a being ON (closed), resulting in disagreement in the ON/OFF state between the output signal 1 and the output signal 2. On the basis of this disagreement, the teach pendant 10 is inhibited from being operated. Consequently, operations and actions of the machine, such as an industrial robot, to be programmed are also inhibited.

Further, in this embodiment, the first over-press detection contact 62 and the second over-press detection contact 68 are directly connected to the normally closed contact 70a of the emergency stop switch 70. Therefore, even in the case where one of the deadman switches 54, 56 is operated to the over-pressed position, an emergency stop operation is performed immediately, and the teach pendant 10, and the machine to be programmed by the teach pendant 10, are inhibited from performing operations. (If necessary, the driving source or power source of the machine may be turned OFF.) After the emergency stop operation is performed, the teach pendant 10 is not able to return to its normal operating state unless an operation to cancel the emergency stop operation is conducted according to a predetermined procedure. Thus, the teach pendant 10 is prevented from returning to the normal state against the intention of the teaching operator.

In the second embodiment as described above, too, when the teaching operator performs an operation different from normal operations, such as holding the teach pendant 10 with both hands, or bringing the deadman switch(es) 18, 20 to the over-pressed position, the teach pendant 10 is reliably inhibited from being operated, and the machine to be taught or programmed is immediately stopped (or its power source may be turned OFF as needed.) It is thus possible to provide a teaching apparatus (i.e. a control apparatus) that operates with improved safety in accordance with the behavior or movements of the teaching operator.

In this embodiment, two a-contacts are provided for detecting the optimum position of each of the deadman switches 54, 56 so as to generate the deadman switch output signals 1, 2, thus assuring further improved safety. However, it is possible to confirm that only one of the deadman switches 54, 56 is operated (pressed) only by confirming that the line connecting the first b-contact 58 and the second a-contact 66b arranged in series is closed, or the line connecting the second b-contact 64 and the first a-contact 60b arranged in series is closed. In this case, too, similar effects as those provided in the second embodiment can be obtained.

In the embodiment of FIG. 3, single-type contacts are used for the first b-contact 58 and the second b-contact 64 for detecting the non-pressed position of the deadman switches 54, 56, and for the first over-press detecting contact 62 and the second over-press detecting contact 68 for detecting the over-press position. These contacts may be doubled like the first a-contacts 60a, 60b and the second a-contacts 66a, 66b for detecting the optimum position. In this case, by confirming the agreement or coincidence of the open/closed state of the contacts, it is possible to determine whether each contact is operating in a good condition, namely, to determine the operating state of the deadman switches 54, 56, thereby to improve the safety. Furthermore, since the first b-contact 58, the second b-contact 64, and the first over-press detecting contact 62 and the second over-press detecting contact 68 for detecting the over-pressed position employs a forced releasing or opening mechanism, each output can be generated with high reliability. With the first over-press detecting contact 62 and the second over-press detecting contact 68 employing the forced releasing mechanism, an emergency stop condition can be surely established when the over-pressed position is detected, thus assuring further improved reliability. The forced releasing or opening mechanism may be adopted even if the contacts are doubled or multiplied as mentioned above. In this case, too, similar effects can be obtained.

It should be noted that the circuit arrangements as shown in FIG. 2 and FIG. 3 are merely examples, and may be modified as needed as long as the teach pendant, and the machine to be programmed by the pendant, are inhibited from being operated or performing operations when the two deadman switches are operated (i.e., pressed) at the same time. While the invention is applied to a teaching apparatus, such as a teaching pendant, in the illustrated embodiments, the invention may be equally applied to any type of control apparatus provided that it includes two three-position switches, no matter what type of object is controlled by the control apparatus.

What is claimed is:

1. A control apparatus that is selectively placed in an allowed state in which the apparatus is allowed to be operated and an inhibited state in which the apparatus is inhibited from being operated, the control apparatus comprising:
   a first switch and second switch, each of which has a plurality of operated positions including a non-pressed position at which a press stroke over which the respective switch is pressed is smaller than a predetermined range, an optimum operated position at which the press stroke is within the predetermined range, and an over-pressed position at which the press stroke is larger than the predetermined range;
   a detector that determines whether the first switch is positioned in the non-pressed position, the optimum operated position, or the over-pressed position, and whether the second switch is positioned in the non-pressed position, the optimum operated position, or the over-pressed position; and
   a controller that establishes the inhibited state of the control apparatus, irrespective of the operated positions of the first and second switches, when the detector determines that neither the first switch nor the second switch is positioned to the non-pressed position.

2. The control apparatus according to claim 1, wherein:
   the detector comprises a first contact and a second contact that are opened when the first switch is pressed down, and a third contact and a fourth contact that are opened when the second switch is pressed down; and
   the first contact and the third contact are connected in series while the second contact and the fourth contact are connected in parallel, and a self holding circuit is established when the first and third contacts connected in series are kept closed, and is opened when both of the second contact and the fourth contact connected in parallel are opened so that the controller establishes the inhibited state of the control apparatus.

3. The control apparatus according to claim 1, wherein the controller establishes the inhibited state when at least one of the first switch and the second switch is operated to the over-pressed position, and maintains the inhibited state until both of the first switch and the second switch are returned to the non-pressed positions.

4. The control apparatus according to claim 2, wherein the controller establishes the inhibited state when at least one of the first switch and the second switch is operated to the over-pressed position, and maintains the inhibited state until both of the first switch and the second switch are returned to the non-pressed positions.

5. The control apparatus according to claim 1, wherein the first switch and the second switch are three-position switches.

6. A control apparatus that is selectively placed in an allowed state in which the apparatus is allowed to be operated and an inhibited state in which the apparatus is inhibited from being operated, the control apparatus comprising:
   a first switch and a second switch, each of which has a plurality of operated positions including a non-pressed position at which a press stroke over which the respective switch is pressed is smaller than a predetermined range, an optimum operated position at which the press stroke is within the predetermined range, and an over-pressed position at which the press stroke is larger than the predetermined range;
   a determining unit that determines a current operated position of each of the first switch and the second switch, out of the non-pressed position, the optimum operated position and the over-pressed position;
   a controller that establishes the inhibited state of the control apparatus when the determining unit determines that both of the first and second switches are operated to the optimum operated positions, and establishes the allowed state of the apparatus when one of the first and second switches is operated to the optimum operated position and the other switch is operated to the non-pressed position; and
   an over-press detector that determines whether at least one of the first switch and the second switch is operated to the over-pressed position, the controller establishing an emergency stop condition when the over-press detector determines that the at least one of the first and second switches is operated to the over-pressed position.

7. The control apparatus according to claim 6, wherein:
   the first switch comprises a first b-contact that identifies the non-operated position thereof and a first a-contact that identifies the optimum operated position thereof;
   the second switch comprises a second b-contact that identifies the non-operated position thereof and a second a-contact that identifies the optimum operated position thereof; and
   the first b-contact and the second a-contact are connected in series, and the second b-contact and the first a-contact are connected in series.

8. The control apparatus according to claim 6, wherein the first and second switches are three-position switches.

9. A method of controlling a control apparatus that is selectively placed in an allowed state in which the apparatus is allowed to be operated and an inhibited state in which the apparatus is inhibited from being operated, comprising the steps of:
   determining whether a first switch is positioned in a non-pressed position, an optimum operated position, or another position and whether a second switch is positioned in the non-pressed position, the optimum operated position, or the other position; and
   establishing the inhibited state of the control apparatus, irrespective of the operated positions of the first and second switches, when a detector determines that neither the first switch nor the second switch is positioned to the non-pressed position.

10. The method according to claim 9, wherein the inhibited state is established when at least one of the first switch and the second switch is operated to the over-pressed position, and the inhibited state is maintained until both of the first switch and the second switch are returned to the non-pressed positions.

11. A method of controlling a control apparatus that is selectively placed in an allowed state in which the apparatus is allowed to be operated and an inhibited state in which the apparatus is inhibited from being operated, comprising the steps of:
   determining a current operated position of each of a first switch and a second switch, the operated position being selected from a non-pressed position at which a press stroke over which the respective switch is pressed is smaller than a predetermined range, an optimum operated position at which the press stroke is within the predetermined range, and an over-pressed position at which the press stroke is larger than the predetermined range;
   establishing the inhibited state of the control apparatus when it is determined that both of the first and second switches are operated to the optimum operated positions, and establishing the allowed state of the apparatus when one of the first and second switches is operated to the optimum operated position and the other switch is operated to the non-pressed position; and
   establishing an emergency stop condition of the control apparatus when it is determined that at least one of the first and second switches is operated to the over-pressed position.

12. A control apparatus for controlling a machine, comprising:
   a first switch including at least a first position, a second position, and a third position, the second position being an optimum operated position;
   a second switch including at least a first position, a second position, and a third position, the second position being an optimum operated position;
   a detector determining an operated position of each of the first switch and the second switch; and
   a controller for establishing an inhibited state of the machine when the detector detects operation of both the first and second switches to the second position as the optimum operated position, and establishing an operational state of the machine when the detector detects operation of either one of the first and second switches to the second position as the optimum operated position and operation of the other switch to one of the first and third positions.

13. The control apparatus of claim 12, wherein the first position of the first switch and the second switch is smaller than a predetermined range of motion of the switch, the second position of the first switch and the second switch is within the predetermined range, and the third position of the first switch and the second switch is larger than the predetermined range.

14. The control apparatus according to claim 12, wherein the controller establishes the operational state of the machine when the detector detects operation of one of the first switch and the second switch to the second position.

15. A control apparatus that is selectively placed in an allowed state in which the apparatus is allowed to be operated and an inhibited state in which the apparatus is inhibited from being operated, the control apparatus comprising:
   a first switch and second switch, each of which has a plurality of operated positions including a non-pressed position at which a press stroke over which the respective switch is pressed is smaller than a predetermined range, an optimum operated position at which the press stroke is within the predetermined range, and an over-pressed position at which the press stroke is larger than the predetermined range;
   a detector that individually determines whether the first switch is pressed down and whether the second switch is pressed down; and
   a controller that establishes the inhibited state of the control apparatus, irrespective of the operated positions of the first and second switches, when the detector determines that both the first switch and the second switch are pressed down, and establishes the allowed state of the apparatus when the detector determines that only one of the first switch and the second switch is pressed down and operated to an optimum operated position;
   wherein the detector comprises a first contact and a second contact that are opened when the first switch is pressed down, and a third contact and a fourth contact that are opened when the second switch is pressed down; and
   the first contact and the third contact are connected in series while the second contact and the fourth contact are connected in parallel, and a self holding circuit is established when the first and third contacts connected in series are kept closed, and is opened when both of the second contact and the fourth contact connected in parallel are opened so that the controller establishes the inhibited state of the control apparatus.

16. A control apparatus that is selectively placed in an allowed state in which the apparatus is allowed to be operated and an inhibited state in which the apparatus is inhibited from being operated, the control apparatus comprising:
   a first switch and second switch, each of which has a plurality of operated positions including a non-pressed position at which a press stroke over which the respective switch is pressed is smaller than a predetermined range, an optimum operated position at which the press stroke is within the predetermined range, and an over-pressed position at which the press stroke is larger than the predetermined range;
   a unit that determines whether the first switch is positioned in the non-pressed position, the optimum operated position or the over-pressed position, and whether the second switch is positioned in the non-pressed position, the optimum operated position or the over-pressed position; and
   a controller that establishes the inhibited state of the control apparatus, irrespective of the operated positions of the first and second switches, when the detector determines that both the first switch and the second switch are pressed down, and establishes the allowed state of the apparatus when the detector determines that neither the first switch nor the second switch is positioned to the non-pressed position,:
   wherein the detector comprises a first contact and a second contact that are opened when the first switch is pressed down, and a third contact and a fourth contact that are opened when the second switch is pressed down;

the first contact and the third contact are connected in series while the second contact and the fourth contact are connected in parallel, and a self holding circuit is established when the first and third contacts connected in series are kept closed, and is opened when both of the second contact and the fourth contact connected in parallel are opened so that the controller establishes the inhibited state of the control apparatus, and wherein the controller establishes the inhibited state when at least one of the first switch and the second switch is operated to the over-pressed position, and maintains the inhibited state until both of the first switch and the second switch are returned to the non-pressed positions.

17. A control apparatus that is selectively placed in an allowed state in which the apparatus is allowed to be operated and an inhibited state in which the apparatus is inhibited from being operated, the control apparatus comprising:

a first switch and a second switch, each of which has a plurality of operated positions including a non-pressed position at which a press stroke over which the respective switch is pressed is smaller than a predetermined range, an optimum operated position at which the press stroke is within the predetermined range, and an over-pressed position at which the press stroke is larger than the predetermined range;

a determining unit that determines a current operated position of each of the first switch and the second switch, out of the non-pressed position, the optimum operated position and the over-pressed position;

a controller that establishes the inhibited state of the control apparatus when the determining unit determines that both of the first and second switches are operated to the optimum operated positions, and establishes the allowed state of the apparatus when one of the first and second switches is operated to the optimum operated position and the other switch is operated to the non-pressed position; and an over-press detector that determines whether at least one of the first switch and the second switch is operated to the over-pressed position, the controller establishing an emergency stop condition when the over-press detector determines that the at least one of the first and second switches is operated to the over-pressed position;

wherein the first switch comprises a first b-contact that identifies the non-operated position thereof and a first a-contact that identifies the optimum operated position thereof;

the second switch comprises a second b-contact that identifies the non-operated position thereof and a second a-contact that identifies the optimum operated position thereof; and the first b-contact and the second a-contact are connected in series, and the second b-contact and the first a-contact are connected in series.

* * * * *

UNITED STATES PATENT AND TRADEMARK OFFICE
CERTIFICATE OF CORRECTION

PATENT NO. : 7,154,197 B2  
APPLICATION NO. : 10/156069  
DATED : December 26, 2006  
INVENTOR(S) : Kazutsugu Suita et al.

It is certified that error appears in the above-identified patent and that said Letters Patent is hereby corrected as shown below:

Title Page Item (75), in the address of the third inventor, Yoshinori Kakuda, "Toyama-ken" should read --Nei-gun--;

Title Page Item (73), in the address of the first assignee, "Aichi-ken" should read --Toyota-shi--;

Title Page Item (73), in the address of the second assignee, "Hyogo-ken" should read --Hyogo--;

Title Page Item (73), in the address of the third assignee, "Toyama-ken" should read --Toyama-shi--;

Col. 14, line 65, "position,:" should read --position;--.

Signed and Sealed this

Nineteenth Day of February, 2008

JON W. DUDAS  
*Director of the United States Patent and Trademark Office*